United States Patent
Duncan et al.

(10) Patent No.: US 12,235,710 B2
(45) Date of Patent: Feb. 25, 2025

(54) INTELLIGENT BATTERY DISCHARGE CONTROL TO SUPPORT ENVIRONMENTAL EXTREMES

(71) Applicant: Dell Products L.P., Round Rock, TX (US)

(72) Inventors: Tyler Baxter Duncan, Austin, TX (US); Colin Kent Mahaffey, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 17/577,589

(22) Filed: Jan. 18, 2022

(65) Prior Publication Data
US 2023/0229225 A1    Jul. 20, 2023

(51) Int. Cl.
G06F 1/32       (2019.01)
G06F 1/26       (2006.01)
G06F 1/3212     (2019.01)
G06F 1/3246     (2019.01)
H02J 7/00       (2006.01)
H02J 9/06       (2006.01)
G01W 1/10       (2006.01)

(52) U.S. Cl.
CPC ............ G06F 1/3246 (2013.01); G06F 1/263 (2013.01); G06F 1/3212 (2013.01); H02J 7/0048 (2020.01); H02J 7/0063 (2013.01); H02J 9/06 (2013.01); G01W 1/10 (2013.01)

(58) Field of Classification Search
None
See application file for complete search history.

(56) References Cited

U.S. PATENT DOCUMENTS

| | | | |
|---|---|---|---|
| 2011/0006737 A1* | 1/2011 | Saligram | H02J 7/04 320/134 |
| 2014/0214251 A1* | 7/2014 | Sugiyama | B60L 58/20 903/930 |
| 2015/0142179 A1* | 5/2015 | Ito | F24F 11/46 700/276 |
| 2015/0226445 A1* | 8/2015 | Jin | F24F 11/46 700/276 |
| 2015/0329003 A1* | 11/2015 | Li | B60L 50/16 320/134 |
| 2016/0305791 A1* | 10/2016 | Neubecker | B60L 58/12 |
| 2016/0377686 A1* | 12/2016 | Uchida | G01R 31/3842 702/63 |
| 2018/0309172 A1 | 10/2018 | Ito et al. | |
| 2019/0023147 A1 | 1/2019 | Komiyama et al. | |

(Continued)

OTHER PUBLICATIONS

International Search Report and Written Opinion mailed Apr. 5, 2023 for corresponding PCT Application No. PCTUS2023010731 filed on Jan. 13, 2023 (66 pages).

*Primary Examiner* — Danny Chan
(74) *Attorney, Agent, or Firm* — Chamberlain, Hrdlicka, White, Williams & Aughtry; Aly Z. Dossa (57) ABSTRACT

Embodiments of the present invention provide a method for powering an electronic device with a battery or other backup power supply when an external power source is removed from the electronic device. The method determines if the ambient temperature of an electronic device is below a threshold and if the ambient temperature is below the threshold adjusting a minimum state of charge of the battery to prolong the life of the battery.

12 Claims, 6 Drawing Sheets

(56) References Cited

U.S. PATENT DOCUMENTS

| | | | |
|---|---|---|---|
| 2020/0039376 A1* | 2/2020 | Miyaki | B60L 58/12 |
| 2020/0317187 A1* | 10/2020 | Assaliyski | B60W 20/13 |
| 2020/0409361 A1* | 12/2020 | Herman | B60W 10/24 |
| 2021/0033035 A1* | 2/2021 | Yang, II | B60W 40/08 |
| 2021/0152008 A1 | 5/2021 | Yen | |
| 2022/0148341 A1* | 5/2022 | Martin | G01R 31/3647 |
| 2022/0336873 A1* | 10/2022 | Zhao | H02J 7/0048 |
| 2022/0381834 A1* | 12/2022 | Maresh | H01M 10/44 |

\* cited by examiner

INTELLIGENT BATTERY DISCHARGE CONTROL TO SUPPORT ENVIRONMENTAL EXTREMES

BACKGROUND

As networking and communication technologies advance, there is an increased need for providing datacenters closer to the end users or on the "Edge". These datacenters are typically smaller than that of large "Cloud" based datacenters, but still have requirements that are similar to those of large Cloud based datacenters.

The information handling system mounted in the datacenters are generally designed for a 10° C. to 35° C. environment. However, during extended power outages such as caused by loss of external power or breaker failures, edge datacenters may be exposed to extreme temperatures. This can result in the information handling systems and/or its components needing to operate below or above the range which they are designed for. This can be harmful to components such as backup batteries and processors in the information handling system. Potentially, if the information handling system is operated outside of the range it is designed for, device failures can occur.

SUMMARY

Embodiments of the present invention provide a method for determining if the ambient temperature is below a threshold and if the ambient temperature is below the threshold, dynamically adjusting a minimum state of charge of a backup battery to protect the battery from potential damage caused by exposure to low ambient conditions.

In accordance with the first aspect, the present invention provides a method for determining the time a battery can safely be discharged. The method includes that in response to observing that external power has been removed from a load, the load is then powered with the battery. The method then comprises of determining an ambient temperature and based on that determination, determining a minimum state of charge for the battery operating at the ambient temperature. Once the minimum state of charge is determined, a maximum time the battery can power the load before discharging below the minimum state of charge is determined. The method further comprises of initiating a shut-down of the load when the external power is not restored and the battery has powered the load for the determined maximum time.

In accordance with the second aspect, the present invention provides an electronic device comprising a backup power supply that includes at least a battery. The electronic device further includes a processor that controls the at least one backup power supply and a memory having computer program instructions stored thereon. The processor executes the computer program instructions in the memory to determine a minimum ambient temperature and a minimum state of charge for the battery operating at the minimum ambient temperature. The processor then uses the determined minimum state of charge for the battery, to determine a maximum amount of time the battery can power the electronic device before the battery discharges below the determined minimum state of charge. When external power has been removed from the electronic device, the processor then causes the battery to power the electronic device by the battery. If the external power is not restored to the electronic device when the battery has powered the electronic device for the determined maximum time, the processor causes the electronic device to shut down.

In accordance with the third aspect, it provides a computer program product, which is tangibly stored in a non-transitory computer storage medium and includes machine-executable instructions, the machine-executable instructions, when executed by a device, causes the device to execute a method. The method comprises that in response to observing that external power has been removed from a load, the load is powered with a battery. The method then determines an ambient temperature, and based on that determination, the method determines a minimum state of charge for the battery. Using the minimum state of charge for the battery, the method determines a maximum time the battery can power the load before discharging below the minimum state of charge. The method further comprises of initiating a shut-down of the load when the external power is not restored and the battery has powered the load for the determined maximum time.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a front view of a diagram of an information handling system in accordance with one or more embodiments of the invention.

FIG. 1.2 shows a side view of a diagram of an information handling system in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing components of an electronic device. The electronic device can be any device that uses a battery to provide backup power when external power has been removed, such as but not limited to a personal computer, television, a smart phone, an automobile, and or any other device that uses a battery to provide backup power when external power has been removed.

In at least one embodiment, the electronic device is an information handling system that may be a system that provides computer implemented services. These services may include, for example, database services, electronic communication services, data storage services, etc.

To provide these services, the information handling system may include one or more computing devices. The computing devices may include any number of computing components that facilitate providing of the services of the information handling system. The computing components may include, for example, processors, memory modules, circuit cards that interconnect these components, etc.

During operation, these components may be exposed to external environmental/ambient air or gasses which may be at various temperatures including outside of a safe operational temperature range. When the temperature is outside of the safe operational temperature range, many of the components can be damaged if they are operated, without making adjustments and/or providing heating or cooling as appropriate. Without proper heating and cooling, over time, this may cause the components to fail prior to the computing devices meeting their expected service life.

Embodiments of the invention may provide methods and systems to actively monitor the ambient temperatures associated with an electronic device and make corresponding changes to the operation of the various components making up the electronic devices including a backup power supply. To determine when the ambient temperatures are outside of a preferred range, monitoring circuits will monitor the outside ambient temperature either with an ambient temperature sensor and/or by accessing networked sources of temperature data such as local weather forecasts.

By determining ambient temperatures associated with the electronic devices, the battery state of charge can be adjusted to ensure the battery is not operated in such a way, that the battery temperature drops below the freezing point of the electrolyte (the freezing point of the electrolyte is a function of the state of charge). By doing so, a battery that is part of the backup power supply in accordance with embodiments of the invention may be less likely to prematurely fail, and be able to operate in less than ideal environmental conditions and maintain proper functioning of devices that it powers.

Figure 11:
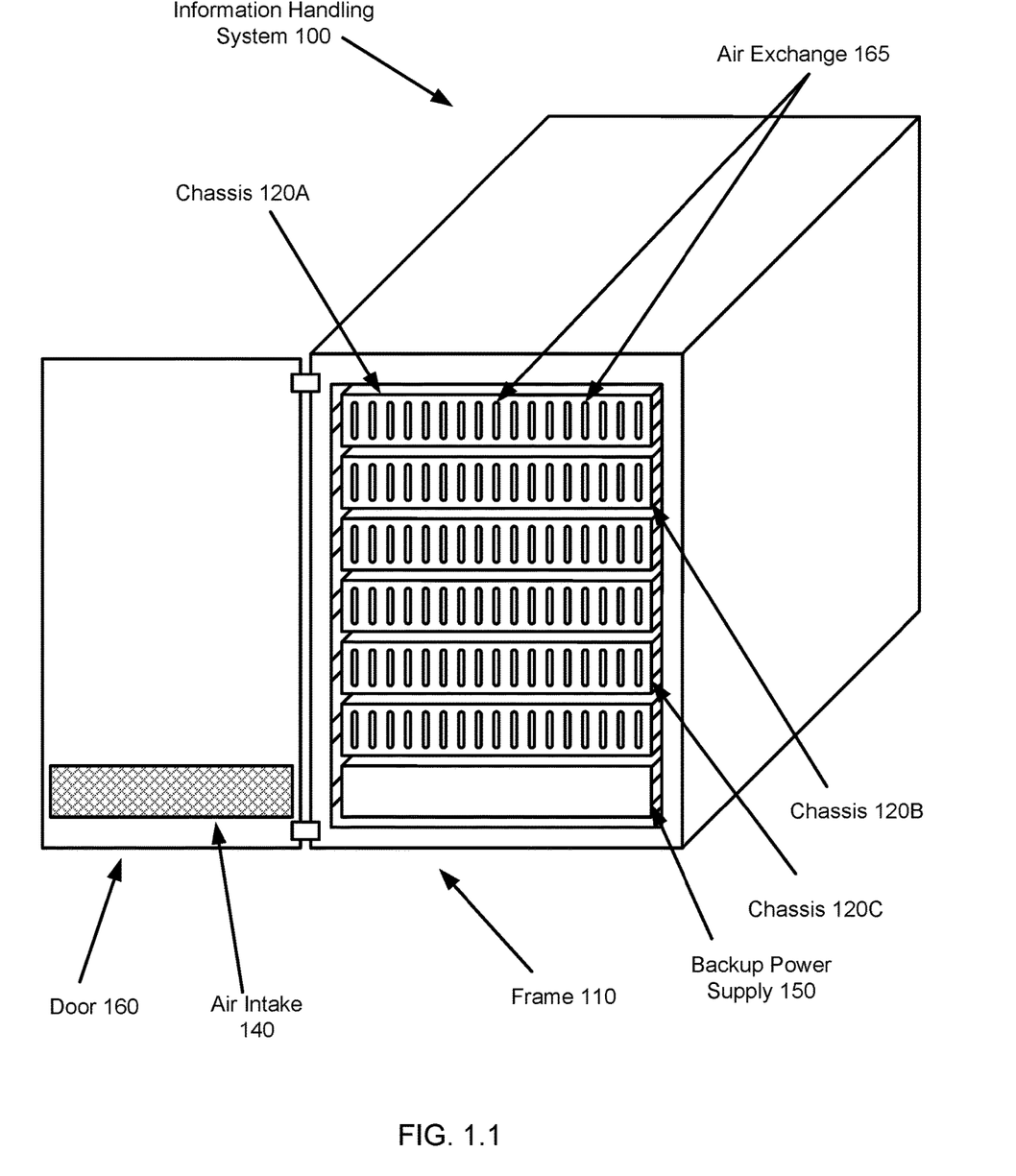
Figure 12:
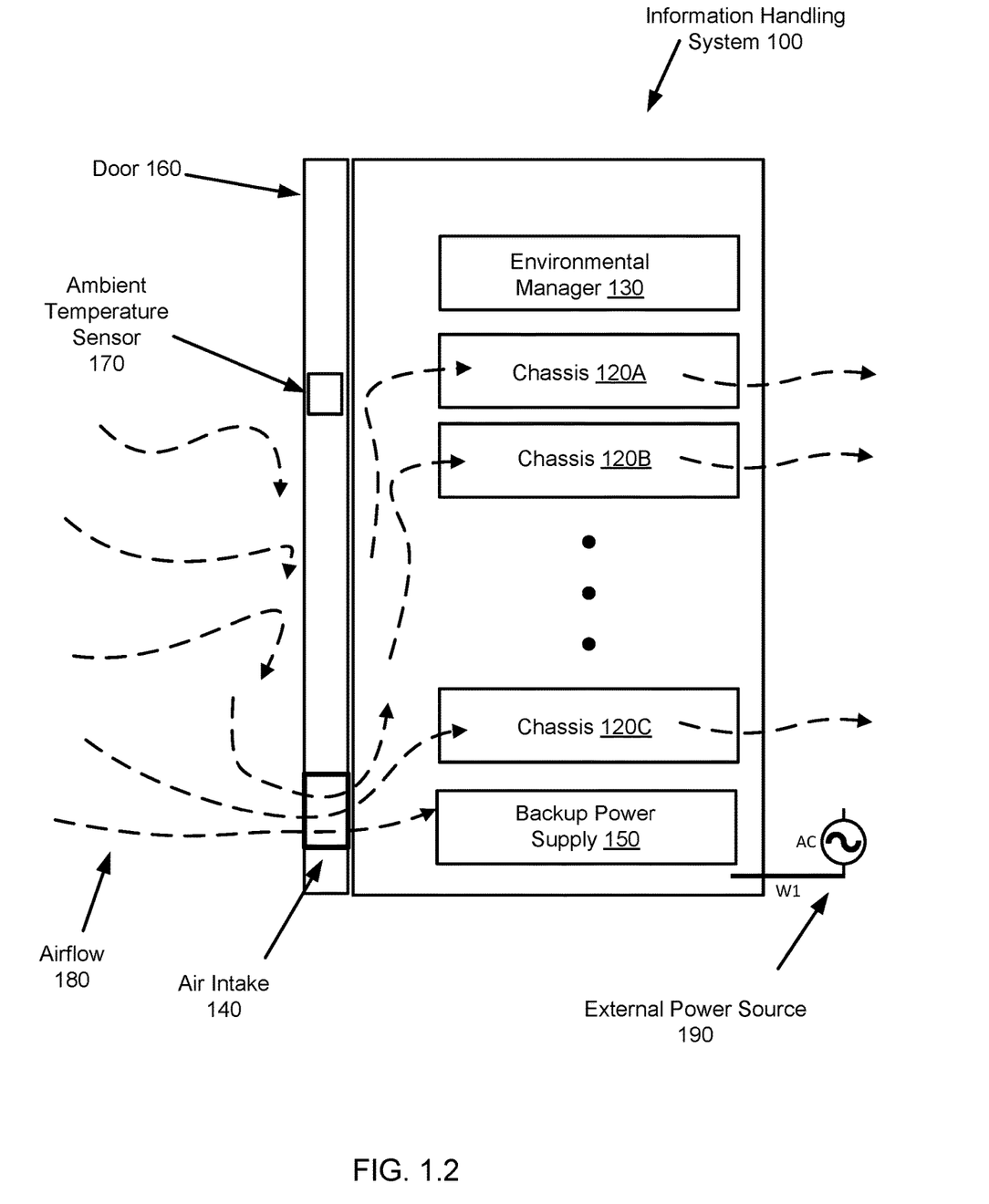

FIG. 1.1 shows the front of an information handling system (100) in accordance with one or more embodiments of the invention and FIG. 1.2 shows a side view of an information handling system (100) in accordance with one or more embodiments of the invention. The system may include a frame (110) and any number of chassis (e.g., 120A, 120B, 120C).

The frame (110) may be a mechanical structure that enables multiple chassis (120A-120C) to be positioned with respect to one another. The mechanical structure of the frame (110) can include a door (160) that includes an air intake (140) for providing external ambient air to the chassis (120A) mounted within the frame (110).

The information handling system (100) can take many forms. For example, the frame (110) may be a rack mount enclosure that enables the chassis (120A) to be disposed within it. The frame (110) may also include a backup power supply (150) mounted within so that it can power the various structures including the chassis (120A) when external power is withdrawn.

The frame (110) may be implemented as other types of structures adapted to house, position, orient, and/or otherwise physically, mechanically, electrically, and/or thermally manage a chassis. By managing the chassis, the frame (110) may enable multiple chassis (120A) to be densely packed in space without negatively impacting the operation of the information handling system (100).

A chassis (e.g., 120A) may be a mechanical structure for housing components of an information handling system. For example, a chassis (120A) may be implemented as a rack mountable enclosure for housing components of an information handling system. The chassis may be adapted to be disposed within the frame (110) and/or utilize services provided by the frame (110) and/or other devices. Any number of components may be disposed in each of the respective chassis (e.g., 120A, 120B, 120C).

The system may further include an ambient temperature sensor (FIG. 1.2, 170) which can be mounted within the frame such as in the door (160) as shown. It can alternatively or in addition be mounted outside of the information handling system (100) such as but not limited to in the airflow (180), in the various chassis (120A), in the air intake (140), or other components within such as an environmental manager (FIG. 1.2, 130) and backup power supply (150).

Alternatively, according to some embodiments, the system may not include an ambient temperature sensor. The system in these embodiments can obtain ambient temperatures from external sources networked with the information handling system (100). These can be from temperature sensors associated with an enclosure (not shown) housing one or more information handling systems (100). Alternatively, they can be provided by an information service that provides weather data and/or forecasts associated with the location where the information handling system (100) is disposed. The invention is not limited to the aforementioned examples.

The backup power supply (150) can take many forms. An exemplary form according to some embodiments is that of a uninterruptible power supply (UPS), which provides power to one or more chassis (120A-120C) and/or other components of the information handling system (100) when external power is lost. A UPS typically comprises of a lead-acid battery, but can comprise of other well-known batteries such as but not limited to batteries that include lithium, magnesium, nickel, and alkaline materials.

The backup power supply (150) alternatively, can comprise of one or more batteries that provide power to components of the information handling system (100) when an external power source (not shown) is lost. The batteries generally include a cathode, an anode, and at least an electrolyte solution.

The external power source (190) can take any form. The external power source (190) in one embodiment is electrical power provided by an electrical utility. In other embodiments it may take the form of on-site power generators, including backup fossil-fuel burning generators, solar panels, wind energy, and other sources of power for operating computing components. While shown as an alternating current (AC) source of power, the external power source (190) can also be a direct current (DC) source of power. The generating components of the external power source (190) can be located near to the information handling system (100) or deliver power to the information handling system over transmission which means from off-site locations.

While the chassis (120A) has been illustrated as including a limited number of specific components, a chassis in accordance with one or more embodiments of the invention may include additional, fewer, and/or different components without departing from the invention. Additionally, while the chassis (120A) is illustrated as having a specific form factor (e.g., rack mount), a chassis in accordance with embodiments of the invention may have different form factors without departing from the invention, including as a device that can operate by itself with or without a frame (110).

As discussed above, the chassis (120A) may house computing components (not shown). The computing components may enable computing devices to provide services, as discussed above. The computing components may include, for example, packaged integrated circuits (e.g., chips). The computing components may enable any number and type of functionalities to be performed by a computing device. See e.g., FIG. 5.

In one or more embodiments disclosed herein, the computing components in the chassis (120A) include storage that is implemented using devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the computing components in the chassis (120A) may include a memory device (e.g., a dual in line memory device) in which data is stored and from which copies of previously stored data are provided. In another example, the computing components may include a persistent storage device (e.g., a solid state disk drive) in which data is stored and from which copies of previously stored data are provided. In another example, computing components may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

To operate components within a preferred range of temperatures, the chassis may include air exchanges (e.g., 165). An air exchange (165) may be one or more openings in an exterior of a chassis that enables the chassis to exchange gases such as air with an ambient environment. For example, a chassis may utilize air exchanges to (i) vent hot air and (ii) intake cool air. By doing so, the temperature of the air within the chassis may be reduced. Consequently, the temperatures of components within the chassis may be reduced by utilizing the cooler gases taken into the chassis via an air exchange.

However, utilizing ambient air to cool components within a chassis may be problematic. The ambient air may not be benign. For example, the air may include gasses that are (i) outside of the preferred range of temperatures, (ii) include chemically reactive components, (iii) include humidity, (iv) include dust or other contaminants, and/or (v) otherwise interact with components disposed within the chassis in an undesirable manner. The reaction between the gases used to cool the components and the components themselves (or other components proximate to the to-be-cooled components) may negatively impact the components disposed within the chassis.

In one example, the ambient gases and/or the internal environment of the information handling system (100) may be too cold. This can be detrimental to many of the components. Below a certain temperature normal transistor operation of processors can be negatively affected. Further other components such as batteries can fail and/or rupture at a significantly low temperature.

To address the above and/or other potential issues, electronic devices such as an information handling system (100) rely on heating and cooling systems to maintain the proper temperature. Yet in many telecom and edge applications (as non-limiting examples), heating and cooling systems are either not present, or are not sufficient for extreme weather. Also when external power is lost, it is possible that the heating and cooling systems (when present) will no-longer function, leading to any device powered by a back-up power system including the back-up power system to be subject to ambient temperatures.

Back-up power systems such as UPSes generally include at least one battery. In one embodiment the battery is a lead-acid battery that includes a lead anode and a $PbO_2$ cathode with an acid electrolyte such as aqueous sulfuric acid solution. As the temperature of a lead-acid battery drops, the properties of the acid electrolyte change. One of the changes is that the state of charge (SOC) including a minimum state of charge (MSOC), changes with temperature.

State of charge (SOC) is the level of charge of an electric battery relative to its capacity. This is generally measured in percentages with 0% being empty and 100% full. SOC can be determined by measuring the specific gravity and using a conversion table between specific gravity and SOC. Other means for determining the SOC is through coulomb counting, internal pressure, Kalman filtering, and/or other known means.

Minimum state of charge (MSOC) is the minimum SOC that a battery can be operated at before it violates non-operational specifications and is subject to failure. MSOC is temperature dependent; as the temperature of the environment that battery is placed in drops, MSOC raises. This change in MSOC can be predetermined by the manufacturer of the battery(s) and table can be determined that relates MSOC to ambient operational temperatures. Alternatively, this table can be determined over the operating lifetime of a battery in the field. Using this table, operational times of the battery can be adjusted based on the temperatures measured by an ambient temperature sensor(s) as well as the potential power needed to power a load.

Embodiments of the invention may provide methods, devices, and systems that manage batteries providing back-up power in order to prolong their operation in cold environments, while minimizing the risk for catastrophic failure of the batteries. To prevent failure of the batteries while providing back-up power, the system and method modifies a battery's operating time to take in account the change in the minimum state of charge for the batteries.

In one or more embodiments of the invention, the management of the batteries may be done by an environmental manager (130), a processor in the backup power supply (150), and/or other processors found in the electronic device. The environmental manager or processor performing the method of this invention can be a separate electronic device or can be implemented using computing code stored on a persistent storage that when executed by a processor performs all, or a portion, of the management of the batteries according to one more embodiments of the invention. The processor may be a hardware processor that includes circuitry such as, for example, a central processing unit or a microcontroller. The processor may be other types of hardware devices for processing digital information without departing from the invention.

The environmental manager (130) and/or other processors and computing components may include one or more data structures that include information regarding the environmental conditions within a chassis. For example, when temperature data is read from a detector, the read information may be stored in an environmental condition repository. Consequently, a historical record of the environmental conditions in the repository may be maintained.

The historical record of the environmental conditions may include any type and quantity of information regarding the environmental conditions within the repository. For example, an environmental condition repository may include temperature sensor data from discrete temperature sensors and/or temperature sensors integrated into computing components (and/or other types of devices). In another example, the environmental condition repository or any equivalent repository, may include a table of the power level in the form of electrical currents, needed to maintain the information handling system to operate at a normal and/or stand-by level.

The tables may also include initial factory determined SOCs and MSOCs for the backup power supply (150) and other batteries installed in the information handling system (100). Consequently, the remaining time that a battery can be safely operated can be determined based on measured ambient temperatures as will be described in more detail below with reference to FIGS. 2-4, may be ascertained using the information included in the tables.

The data structures may also include one or more data structures such as a lifecycle repository that include information regarding the desired life of components disposed in a chassis of an information handling system. For example, the lifecycle repository may specify how many charge/discharge cycles a battery can be operated in normal conditions before it will begin to deteriorate below a predetermined threshold.

While the data structures have been described as including a limited amount of specific information, any of the data structures may include additional, less, and/or different information without departing from the embodiments disclosed herein. Further, the aforementioned data structures may be combined, subdivided into any number of data structures, may be stored in local storage or in other locations (e.g., in a storage hosted by another device), and/or spanned across any number of devices without departing from the embodiments disclosed herein. Any of these data structures may be implemented using, for example, lists, tables, linked lists, databases, or any other type of data structures usable for storage of the aforementioned information.

Further, any of the components may be implemented as a service spanning multiple devices. For example, multiple computing devices housed in multiple chassis may each run respective backup power supplies (150). Each of these instances may communicate and cooperate to provide the functionality of the environmental manager (130).

While the electronic device such as the information handling system (100) has been illustrated in FIGS. 1.1 and 1.2 as including specific numbers and types of components, an electronic device in accordance with embodiments of the invention may include different, fewer, and/or additional components without departing from the invention.

Figure 2:
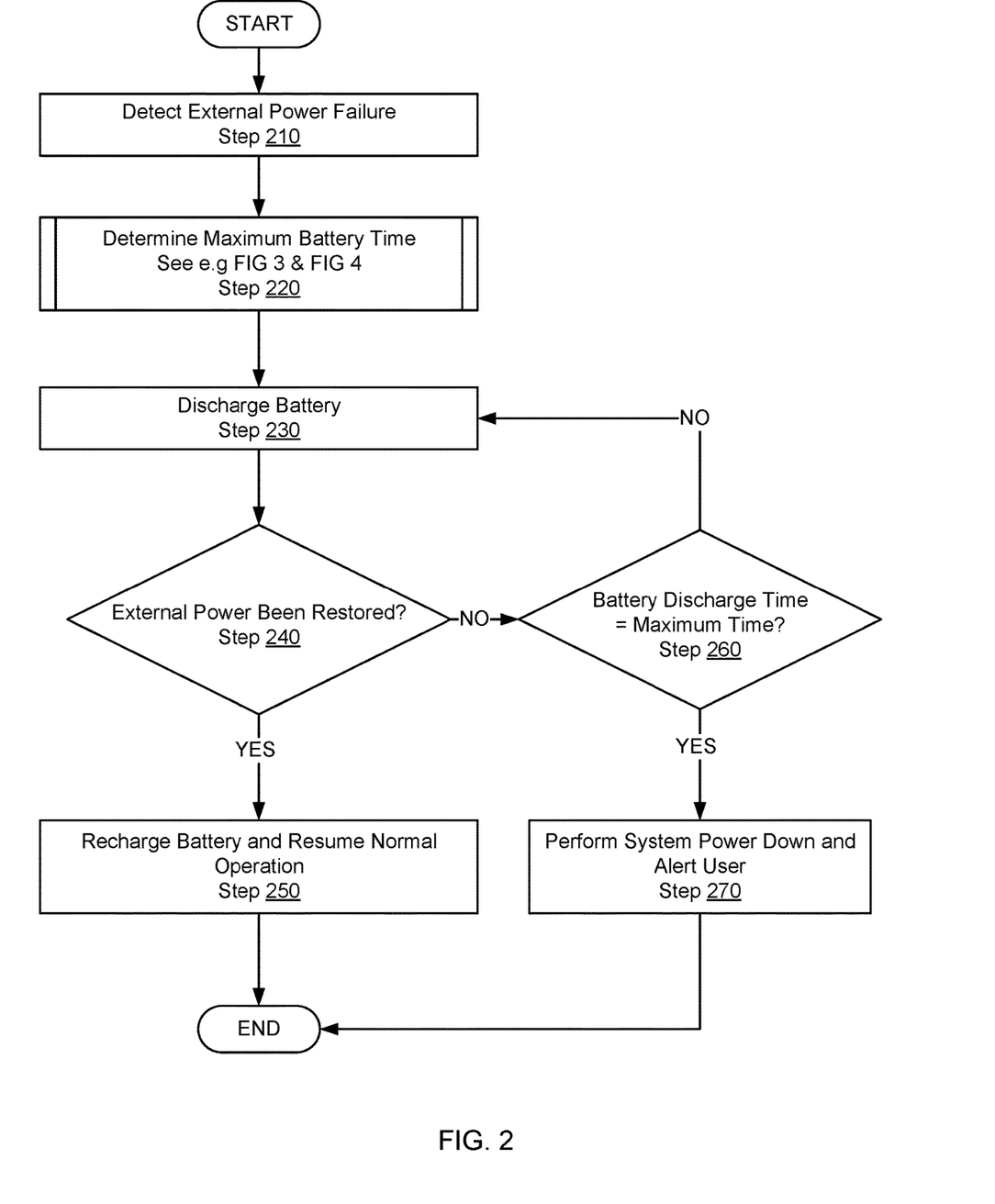
FIG. 2 shows a flowchart of a method for safely discharging a battery after external power failure.
Figure 3:
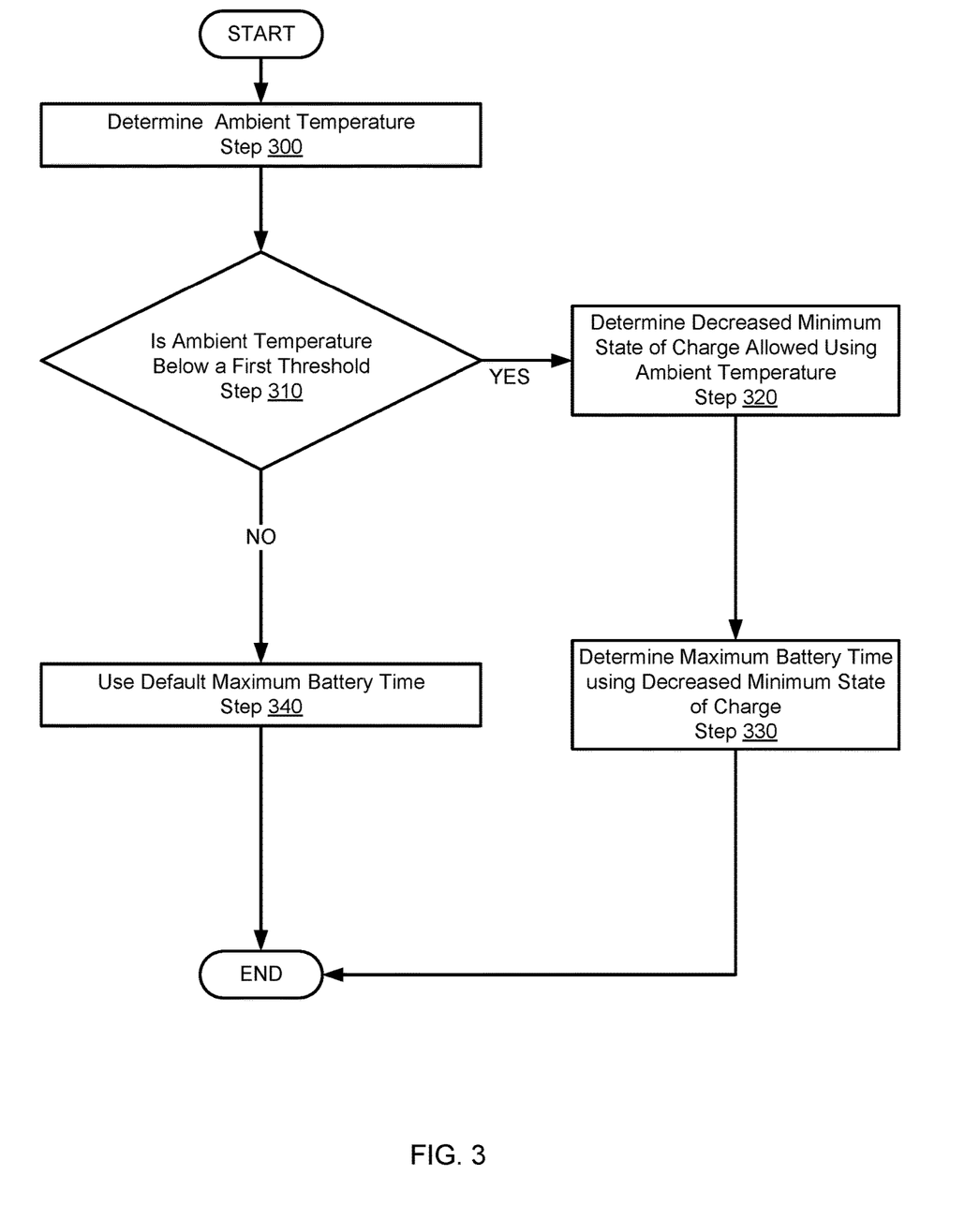
FIG. 3 shows a flowchart of a method for using an ambient temperature to determine minimum state of charge allowed.
Figure 4:
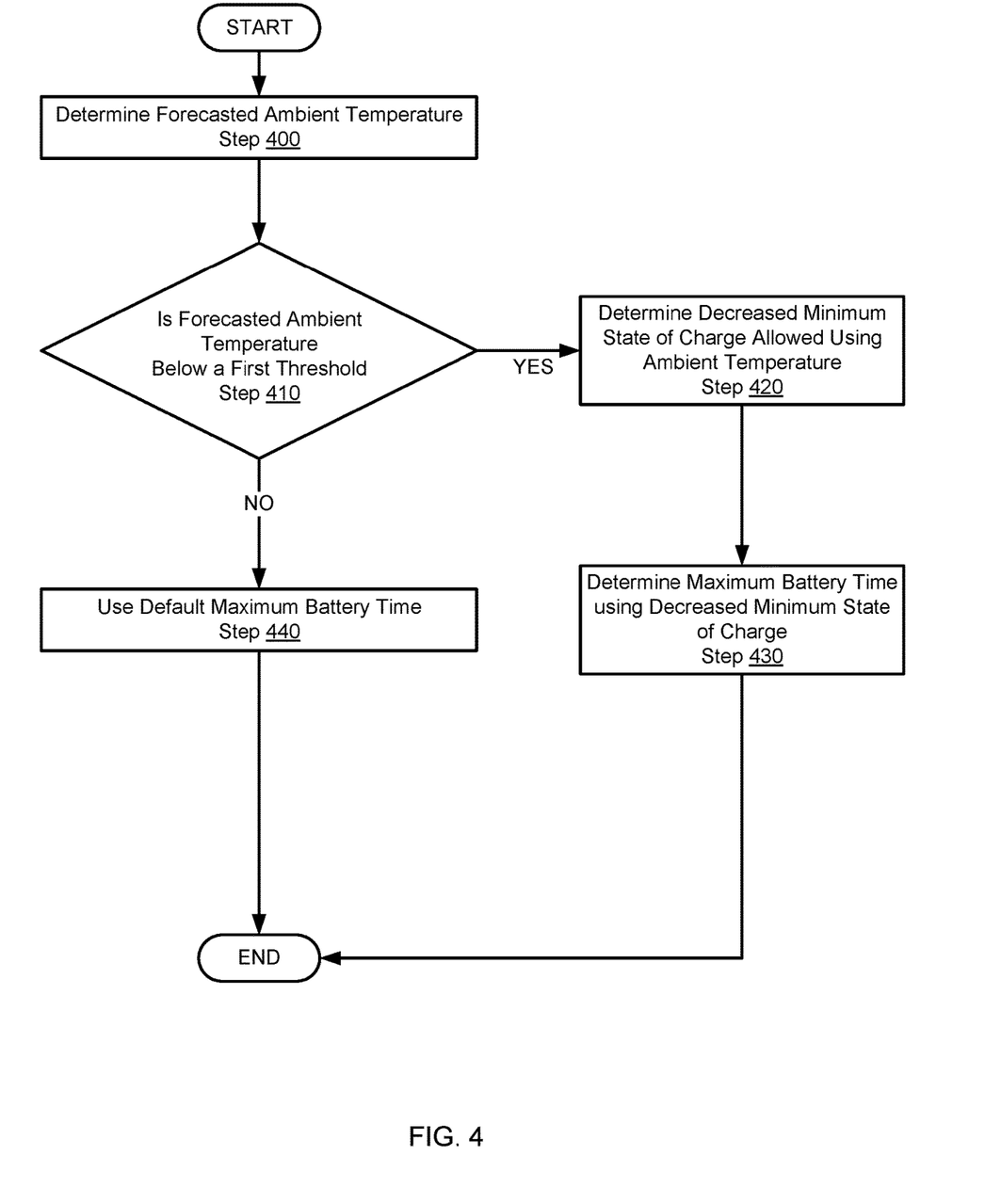
FIG. 4 shows a flowchart of a method for using a forecasted temperature to determine minimum state of charge allowed.

FIGS. 2-4 show a flowchart of a method in accordance with one or more embodiments of the invention. The method depicted in FIG. 2 may be used to operate the battery or backup power supply (150) to provide power to an electronic device such as the information storage system (100) and its components when external power is not available. The method shown in FIG. 2 may be performed by, for example, a controller in the backup power supply (e.g., 150, FIG. 1.2). Other components of the system illustrated in FIGS. 1.1 and 1.2 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 210, external power failure is detected. This can result from problems with the utility providing the power and/or internal faults in the facility housing the electronic device. When the external power fails, the backup power supply (e.g., 150 of FIG. 1.2) such as a UPS quickly engages to provide power to the computing electronic device from a battery or batteries that have been previously charged. These batteries may be disposed in the backup power supply (e.g., 150 of FIG. 1.2) or elsewhere in the vicinity of the electronic device.

In step 220, a processor determines the maximum battery time the battery can be safely operated with the current load. The amount of time is a function of the amount of load and a calculated MSOC. This calculation can be pre-determined when the electronic device is manufactured and loaded into memory as a table. Alternatively, it can be calculated at the time a power failure occurs. The method of determining this time will be discussed in more detail with regards to FIGS. 3 and 4.

In step 230, the battery is discharged to provide power to components of the electronic device. The battery can provide enough power to operate all of the components of the electronic device or the battery can provide power only to those components that are determined (e.g., by an administrator, by the manufacturer, etc.) to be necessary during a power loss.

The battery may include other components for converting the electrical power provided by the battery into useful forms of electrical power for specific components of the electronic device. Such devices can include transformers for increasing or decreasing the provided voltage. Also, AC to DC and DC to AC converters may be provided to convert the output power from the battery to useful forms of electrical power.

In step 240, the processor determines if external power has been restored. This may also require determining that the external power has been restored with an appropriate quality sufficient to operate the electronic device. If external power is not restored or is not sufficient to operate the external device the method proceeds to step 260. If external power is restored the method proceeds to step 250.

In step 250, the electronic device resumes normal operation and the battery(s) begin to recharge. Resuming normal operation may require reactivating components that were shut down or minimized during the power loss. Alternatively, if the backup power supply and its batteries are sufficient to run all of the electronic devices components, normal operation may only require recharging the battery and cancelling any alerts that were generated as a result of external power failure. The battery(s) is recharged in the manner designed by the manufacture of the battery(s) and/or the backup power supply.

Alternatively, in step 260, the processor determines if the battery discharge time is equal to the maximum battery time calculated in step 220. If the time is less than the maximum battery time, the battery continues to discharge and steps 230 and 240 are repeated. If the battery discharge time does equal the maximum battery time, then the processor initiates powering down of the electronic device power down in step 270.

In step 270, the electronic device is powered down. This may take the form of immediately removing power to all components of the electronic device, until external power is restored. In another example this may comprise of the processor beginning a shut-down procedure which includes saving any data in permanent storage. Further, in step 270, the processor may transmit an alert to a user or other concerned party that power has been lost and that the system is being shut down, until power can be restored.

The method of FIG. 2 may end following either steps 250 or 270.

The method depicted in FIG. 3 may be used to determine the maximum safe battery time by determining the ambient temperature. The method shown in FIG. 3 may be performed during step 220 of FIG. 2 and may be performed by, for example, a controller in the backup power supply (e.g., 150, FIG. 1.2). Other components of the system illustrated in FIGS. 1.1 and 1.2 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, the ambient temperature is determined. This can be done by using the ambient temperature sensor (170), which can take a variety of forms such as an external temperature sensor such as a thermocouple or a thermometer. The ambient temperature sensor can be mounted on the housing of the electronic device as shown in FIG. 1.2 or can be mounted elsewhere either inside or outside the housing or facility in which the electronic device is disposed. While a single temperature sensor (170) is shown in FIG. 1.2, the ambient temperature could be determined by finding the average temperature or lowest temperature of a plurality of ambient temperature sensors disposed in various locations associated with the electronic device. The ambient temperature can also be the lowest temperature detected over a specific period or may be a historical lowest temperature for a particular time stored in the memory of the electronic device.

In step 310, a processor determines if the ambient temperature determined by the ambient temperature sensor (170) in step 300, is below a first threshold. The first threshold can be a temperature when MSOC begins to significantly change. For example, this threshold temperature for a lead acid battery may be at 0.3° C. Other threshold temperatures may be higher or lower such as −20° C. depending on the batteries chemistry and other factors.

The threshold can be a constant threshold, set at the time of manufacture, or could be routinely changed as the battery ages and/or based on the temperatures that the battery has been operated over time. For example if the battery is consistently operated at a high temperature for a period of time, it will age quicker than if operated at the nominal temperature.

If it is determined that the ambient temperature is below the first threshold in step 310, the method continues to step 320. However, if the temperature is above the first threshold the method continues to step 340 and the method of FIG. 2 proceeds using a default maximum battery time provided either by the manufacturer or a time determined solely on the load needed by the electronic device and the operating history of the battery.

In step 320, the processor determines a decreased minimum state of charge (MSOC) allowed using the ambient temperature that was determined in step 300. This may take the form of comparing the ambient temperature to MSOC in a table stored in a memory associated with the processor. Alternatively, a calculation may be performed based on the battery's chemistry, present amount of power needed by a load such as the electronic device(s), operating history, and/or other criteria that is determined to have an effect on MSOC. Once the MSOC for the current ambient temperature is determined the method proceeds to step 330.

In step 330 the processor uses the determined decreased minimum state of charge to determine a new maximum battery time. This time can be calculated based on the current load and the determined decreased minimum state of charge, or could be based on historical loads and the decreased minimum state of charge. The processor determines the time, at least in part, by calculating the amount of time, provided the load remains constant, before the current charge equals the minimum state of charge based on the current load and current charge. Alternatively, this could be the amount of time before the current charge of the battery is equal to some number greater than the minimum state of charge that still leaves enough charge to safely shut down the electronic device.

Once the processor determines the maximum battery time in step 330, it proceeds with the remaining steps (230-270) shown in FIG. 2. The method of FIG. 3 may end following either steps 330 or 340.

The method depicted in FIG. 4 may be used to determine the maximum safe battery time by using a forecasted ambient temperature. The method shown in FIG. 4 may be performed during step 220 of FIG. 2 and may be performed by, for example, a controller in the backup power supply (e.g., 150, FIG. 1.2). Other components of the system illustrated in FIGS. 1.1 and 1.2 may perform all, or a portion, of the method of FIG. 3 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, the ambient temperature is determined. This can be done by accessing an external forecast. Such a forecast may be provided by a weather service that can be accessed through an electronic device's communication interface. Alternatively, it can be provided by systems external to the electronic device that track ambient temperature and can forecast future temperatures based on historical temperatures taken over a period of time, averages, and/or weather models. The forecast would need to provide the ambient temperature for a vicinity that includes the location of the electronic device.

The ambient temperature could be determined by finding the average temperature or lowest temperature of a plurality of ambient temperature provided by the forecast or historical temperatures recorded over a preset period of time. The ambient temperature can also be the lowest temperature detected over a specific period or may be a historical lowest temperature for a particular time for the location where the electronic device is located.

In step 410, a processor determines if the forecasted ambient temperature determined in step 400, is below a first threshold. As discussed with regards to the method of FIG. 3, the first threshold can be a temperature when MSOC begins to significantly change. For example, this threshold temperature for a lead acid battery may be at 0.3° C. Other threshold temperatures may be higher or lower such as −20° C. depending on the batteries chemistry and other factors.

The threshold can be a constant threshold, set at the time of manufacture, or could be routinely changed as the battery ages and/or based on the temperatures that the battery has been operating on over time. For example, if the battery is consistently operated at a high temperature for a period of time, it will age quicker than if operated at the nominal temperature.

If it is determined that the ambient temperature is below the first threshold in step 410, the method continues to step 420. However, if the temperature is above the first threshold the method continues to step 440 and the method of FIG. 2 proceeds using a default maximum battery time provided either by the manufacture or a time determined solely on the load needed by the electronic device and the operating history of the battery.

In step 420, the processor determines a decreased minimum state of charge (MSOC) allowed using the ambient temperature that was determined in step 400. This may take the form of comparing the ambient temperature to MSOC in a table stored in a memory associated with the processor. Alternatively a calculation may be performed based on the battery's chemistry, present load needed by the electronic device, operating history, and/or other criteria that is determined to have an effect on MSOC. Once the MSOC for the current ambient temperature is determined, the method proceeds to step 430.

In step 430 the processor uses the determined decreased minimum state of charge to determine a new maximum battery time. This time can be calculated based on the current load and the determined decreased minimum state of charge, or could be based on historical loads and the decreased minimum state of charge. The processor determines the time at least in part by calculating based on the current load and current charge the amount of time if the load remains constant before the current charge equals the minimum state of charge. Alternatively this could be the amount of time before the current charge of the battery is equal to some number greater than the minimum state of charge that still leaves enough charge to safely shut down the electronic device.

Once the processor determines the maximum battery time in step 430, it proceeds with the remaining steps (230-270) shown in FIG. 2. The method of FIG. 4 may end following either steps 430 or 440.

These steps can be repeated for each battery that is part of a backup power supply (150) or other batteries that provide power to components forming the information handling system. Additionally, while in the preferred embodiment, only battery power is used when external power fails, it is within the scope of this invention that other sources of backup power may be used.

Figure 5:
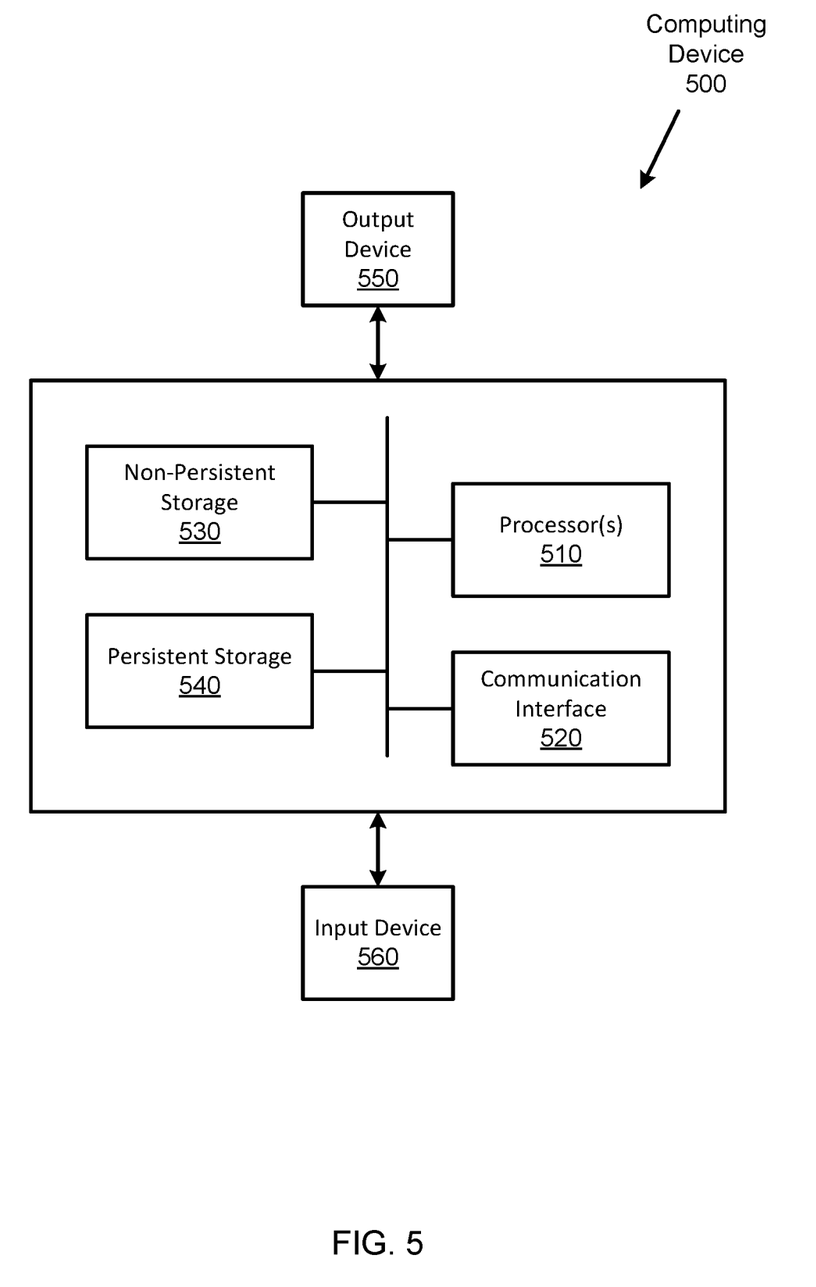
FIG. 5 shows a diagram of a computing device in accordance with one or more embodiments of the invention.

Additionally, as discussed above, embodiments of the invention may be implemented using a computing device. FIG. 5 shows a diagram of a computing device in accordance with one or more embodiments of the invention. The computing device (500) may include one or more computer processors (510), non-persistent storage (530) (e.g., volatile memory, such as random access memory (RAM), cache memory), persistent storage (540) (e.g., a hard disk, an optical drive such as a compact disk (CD) drive or digital versatile disk (DVD) drive, a flash memory, etc.), a communication interface (520) (e.g., Bluetooth interface, infrared interface, network interface, optical interface, etc.), input devices (560), output devices (550), and numerous other elements (not shown) and functionalities. Each of these components is described below.

In one embodiment of the invention, the computer processor(s) (510) may be an integrated circuit for processing instructions. For example, the computer processor(s) may be one or more cores or micro-cores of a processor. The computing device (500) may also include one or more input devices (560), such as a touchscreen, keyboard, mouse, microphone, touchpad, electronic pen, or any other type of input device. Further, the communication interface (520) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (550), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (530), and persistent storage (540). Many different types of computing devices exist, and the aforementioned input and output device(s) may take other forms.

Embodiments of the invention may provide an improved method for determining how long to operate a battery when the temperature is below an ideal temperature. To do so, the system changes the minimum state of charge in accordance to the ambient temperature outside of a data center. This keeps the battery from suffering damage by operating below the minimum state of charge, which can result in damage to the battery or complete failure of the battery.

The system reduces the operating time in accordance to a reduced minimum state of charge. The reduced minimum state of charge is determined by comparing ambient temperature of the air outside of the load to a database of minimum state of charges for a given temperature. Based on the current charge when the battery is powering the load and the rate of discharge, the system can then determine the remaining amount of time the battery can power the load while not reducing the battery's charge below the minimum state of charge for the current temperature.

Thus, embodiments of the invention may address the problem of determining how long to power a load with a battery when the temperature is less than the ideal temperature for the battery.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for determining a time that a battery can safely be discharged, comprising:
   in response to observing that external power has been removed from an information handling system:
   powering the information handling system with the battery,
      wherein the information handling system comprises:
         a frame comprising at least one chassis and the battery, the at least one chassis comprises computing components and an air exchange with heating systems and cooling systems,
         wherein the frame is a rack mount enclosure;
      wherein the information handling system provides computer implemented services consisting of database services, electronic communication services, and data storage services,
      wherein the external power is used as a primary power source for the information handling system,
      wherein the battery provides backup power to the information handling system when the external power has been removed;
   determining an ambient temperature associated with the information handling system, wherein the ambient temperature is determined by accessing a source, networked to the information handling system, that reports a forecast of ambient temperatures over a predetermined period of time and setting the ambient temperature to an average temperature forecasted for the predetermined period of time;
   determining a minimum state of charge for the battery operating at the ambient temperature;
   using the minimum state of charge for the battery, determining a maximum time the battery can power the information handling system before discharging below the minimum state of charge; and
   initiating shut down of the information handling system when the external power is not restored and a discharge time of the battery equals the maximum time.

2. The method of claim 1, wherein the source that reports the forecast is on a network connected to the information handling system.

3. The method of claim 1, wherein the minimum state of charge is determined by accessing a battery specific table that lists the minimum state of charge for a given ambient temperature.

4. The method of claim 1, prior to initiating shut down of the information handling system, issuing an alert to a user.

5. An electronic device comprising:
   a frame comprising at least one chassis, the at least one chassis comprises computing components and an air exchange with heating systems and cooling systems, wherein the frame is a rack mount enclosure, wherein the electronic device provides computer implemented services consisting of database services, electronic communication services, and data storage services;
   a backup power supply that includes at least a battery;
   a processor that controls the backup power supply; and
   a memory having computer program instructions stored thereon, the processor executing the computer program instructions in the memory to perform a method for determining a time that the battery can safely be discharged, the method comprising:
   in response to observing that external power has been removed from the electronic device:
   powering the electronic device with the battery,
      wherein the external power is used as a primary power source for the electronic device,
      wherein the battery provides backup power to the electronic device when the external power has been removed;
   determining an ambient temperature, wherein the ambient temperature is determined by accessing a source, networked to the electronic device, that reports a forecast of ambient temperatures over a predetermined period of time and setting the ambient temperature to an average temperature forecasted for the predetermined period of time;
   determining a minimum state of charge for the battery operating at the ambient temperature;
   using the minimum state of charge for the battery, determining a maximum time the battery can power the electronic device before the battery discharges below the minimum state of charge; and
   if the external power is not restored to the electronic device when the battery has powered the electronic device for the determined maximum time, initiating a shut down of the electronic device.

6. The electronic device of claim 5, wherein the ambient temperature is determined using a sensor operatively connected to the electronic device.

7. The electronic device of claim 5, wherein the source that reports the forecast is on a network connected to the electronic device.

8. The electronic device of claim 5, wherein the minimum state of charge is determined by accessing a battery specific table which lists the minimum state of charge for a given ambient temperature.

9. A computer program product, which is tangibly stored in a non-transitory computer storage medium and includes machine-executable instructions, the machine-executable instructions, when executed by a device, causing the device to execute a method for determining a time that a battery can safely be discharged, the method comprising:
   in response to observing that external power has been removed from an information handling system:
   powering the information handling system with the battery,
      wherein the information handling system comprises:
         a frame comprising at least one chassis and the battery, the at least one chassis comprises computing components and an air exchange with heating systems and cooling systems,
         wherein the frame is a rack mount enclosure, wherein the information handling system provides computer implemented services consisting of database services, electronic communication services, and data storage services, wherein the external power is used as a primary power source for the information handling system, wherein the battery provides backup power to the information handling system when the external power has been removed;

determining an ambient temperature associated with the information handling system, wherein the ambient temperature is determined by accessing a source, networked to the information handling system, that reports a forecast of ambient temperatures over a predetermined period of time and setting the ambient temperature to an average temperature forecasted for the predetermined period of time;

determining a minimum state of charge for the battery operating at the ambient temperature;

using the minimum state of charge for the battery, determining a maximum time the battery can power the information handling system before discharging below the minimum state of charge; and initiating shut down of the information handling system when the external power is not restored and a discharge time of the battery equals the maximum time.

10. The computer program product of claim 9, wherein the source that reports the forecast is on a network connected to the information handling system.

11. The computer program product of claim 9, wherein the minimum state of charge is determined by accessing a battery specific table which lists the minimum state of charge for a given ambient temperature.

12. The computer program product of claim 9, prior to initiating shut down of the information handling system, issuing an alert to a user.

* * * * *